United States Patent
Minami et al.

[11] Patent Number: 5,667,426
[45] Date of Patent: Sep. 16, 1997

[54] METHOD OF POLISHING THE END FACE OF A FERRULE ON AN OPTICAL CONNECTOR

[75] Inventors: Kohji Minami; Hiroyuki Tokita; Keiichi Ishiyama; Nobuo Suzuki, all of Chiba, Japan

[73] Assignee: Seiko Instruments Inc., Japan

[21] Appl. No.: 535,906

[22] Filed: Sep. 28, 1995

[30] Foreign Application Priority Data

Sep. 28, 1994 [JP] Japan ............... 6-233879

[51] Int. Cl.[6] ............................. B24B 451/57
[52] U.S. Cl. ........................... 451/41; 451/41
[58] Field of Search ................... 451/41, 57, 37, 451/60, 270, 271, 43, 44, 290

[56] References Cited

U.S. PATENT DOCUMENTS 5,136,820  8/1992  Luther ................... 451/41

FOREIGN PATENT DOCUMENTS 2019365  1/1987  Japan ................... 451/390

*Primary Examiner*—Robert A. Rose
*Attorney, Agent, or Firm*—Adams & Wilks

[57] ABSTRACT

A method of polishing the end face of a ferrule comprises providing an optical connector having the ferrule and an optical fiber fixed to the ferrule. An abrasive sheet film is provided which comprises a resin film having a layer of alumina type particles disposed on a surface thereof. The end face of the ferrule is polished by pressing it against the abrasive sheet film and sliding the end face of the ferrule relative the abrasive sheet film while supplying an abrasive comprised of colloidal particles of $SiO_2$ on the surface of the abrasive sheet film.

19 Claims, 2 Drawing Sheets

METHOD OF POLISHING THE END FACE OF A FERRULE ON AN OPTICAL CONNECTOR

BACKGROUND OF THE INVENTION

1. Field of the Invention

The present invention relates to a method of forming the end of a connector ferrule fixed around an optical fiber into a convex spherical surface and improves the performance of a connector through reduction in reflected return beams and connection losses which is obtained by performing polishing so that no step is formed between the end faces of the optical fibers and ferrules and by polishing the end faces of the optical fibers with ultra-high precision.

2. Description of the Related Art

In general, an optical fiber is connected to another by securely bonding the optical fibers around the axes of ceramic round bars called ferrules and by aligning the ferrules in a cylindrical sleeve in a face-to-face relationship. Stable performance is obtained by polishing the end faces of the ferrules into convex spherical surfaces with the optical fibers on the vertices thereof to allow the opposite fibers to be brought into abutment by only a small external urging force with little gap (1 µm or less) therebetween.

During the polishing of the end face of a ferrule as described above, the polishing progresses differently on the fiber and ferrule because of the difference in hardness between them since the ferrule surrounding the optical fiber is made of ceramic (alumina or zirconia). Specifically, the polishing progresses faster in the area of the fiber, resulting in a recess in the center of the end of the ferrule. The advent of optical systems of larger capacities and higher speeds has resulted in a need for limiting such a recess to a smaller size. Recently, a polishing technique for obtaining a spherical surface has become essential wherein such a recess is strictly limited to 0.05 µm or less. FIG. 1 shows a conventional method of polishing the end of a ferrule on an optical connector wherein polishing and formation have been carried out by using a resin film 11 tensioned at predetermined force as an abrasive sheet, pressing the end of an optical connector ferrule 8 against the surface of this abrasive sheet, and sliding the end of the optical connector ferrule relative to the film surface with particles 12 (called slurry) of diamond, $SiO_2$ or the like supplied onto the surface of the abrasive sheet as an abrasive. The abrasive sheet and abrasive agent have been used in the following three types of combination.

The first combination is to use a cellulose type resin film as an abrasive sheet and $SiO_2$ type colloidal particles including particles of different sizes mixed with water as an abrasive. In this case, the ends of the ceramic ferrule and the fiber are polished taking advantage of a difference in polishing capability between particles which easily become colloidal and particles which do not. This allows a polishing process wherein the size of the step formed between the ferrule and the optical fiber is limited to 0.05 µm or less.

The second combination is a combination of an abrasive sheet having diamond particles applied and fixed thereon and an abrasive comprises of $SiO_2$ type particles. The third combination is a combination of an abrasive sheet having alumina particles applied and fixed thereon and water as an abrasive.

However, the above-described polishing method has the following problems. Specifically, the first combination has a problem in that a cellulose type abrasive sheet is adversely affected by an alkaline colloidal abrasive constituted by $SiO_2$ type colloidal particles and alcohol used as a cleaner and is susceptible to chemical deterioration and deterioration of mechanical strength such as deformation of the sheet due to its water-absorbing property. Further, in order to maintain sufficient polishing performance using a $SiO_2$ solution, uniform mixing must be carried out by means of agitation of abrasive particles using an ultrasonic cleaner or the like. This has resulted in a problem in that many limitations are placed on the usage and maintenance of this combination.

These factors cause significant fluctuation in polishing performance and result in retraction or projection of a fiber from the end face of a ceramic ferrule. This has created a problem in that the step formed by the fiber can not be regulated to 0.05 µm or less and it is therefore difficult to provide a connector having stable connection performance.

The second combination has a problem in that since diamond is hard and sharp enough, even if it is particulate, to produce scratches on the end face of a fiber which form many abrasion-affected layers thereon, the amount of reflected return beams is increased by the fiber and the affected layers which have different refractive indices and the performance of the connector is thus reduced. Further, the abrasive sheet itself is expensive.

The third combination results in a recess at the fiber portion of 0.1 µm or more which does not meet the requirement.

As described above, according to the conventional polishing method using the first, second, or third combination, distortion can be left on the surface of an optical fiber after it is processed and a large step can be formed on the end of an optical fiber ferrule because of the retraction or projection of the fiber. Therefore, such a method can not be regarded as a technique for polishing an optical connector ferrule with stable and ultra-high quality at a low cost.

The present invention has been conceived taking the above-described situation into consideration, and it is an object of the invention to provide a method of polishing a high performance optical connector ferrule which allows the end of an optical connector ferrule to be polished with stable and high quality at a low cost by eliminating both the generation of abrasion-affected layers on the surface of the optical fiber and the formation of a step between the surface of the ferrule and the fiber.

SUMMARY OF THE INVENTION

In order to achieve the above-described object, according to the present invention, there is provided a method of polishing the end face of a high performance optical connector ferrule with an optical fiber inserted and fixed at the center thereof characterized in that an abrasive film is formed by laminating alumina type particles on a resin film in the form of a sheet; the film is applied onto an elastic sheet to form an abrasive disc; an abrasive mainly composed of colloidal particles of $SiO_2$ is used; the ferrule to be polished is pressed against the abrasive film of the abrasive disc; and the end face of said optical connector ferrule is polished in the form of a convex spherical surface by sliding the end of said optical connector ferrule relative to the surface of said abrasive film with said abrasive supplied onto the surface of said film.

Since polishing is performed using a combination of a resin film having particulate alumina with low polishing capability applied and fixed thereon and colloidal particles of $SiO_2$, a fiber surface can be stably polished at a low cost with a smaller step and less abrasion-affected layers.

DETAILED DESCRIPTION OF THE INVENTION

Figure 2:
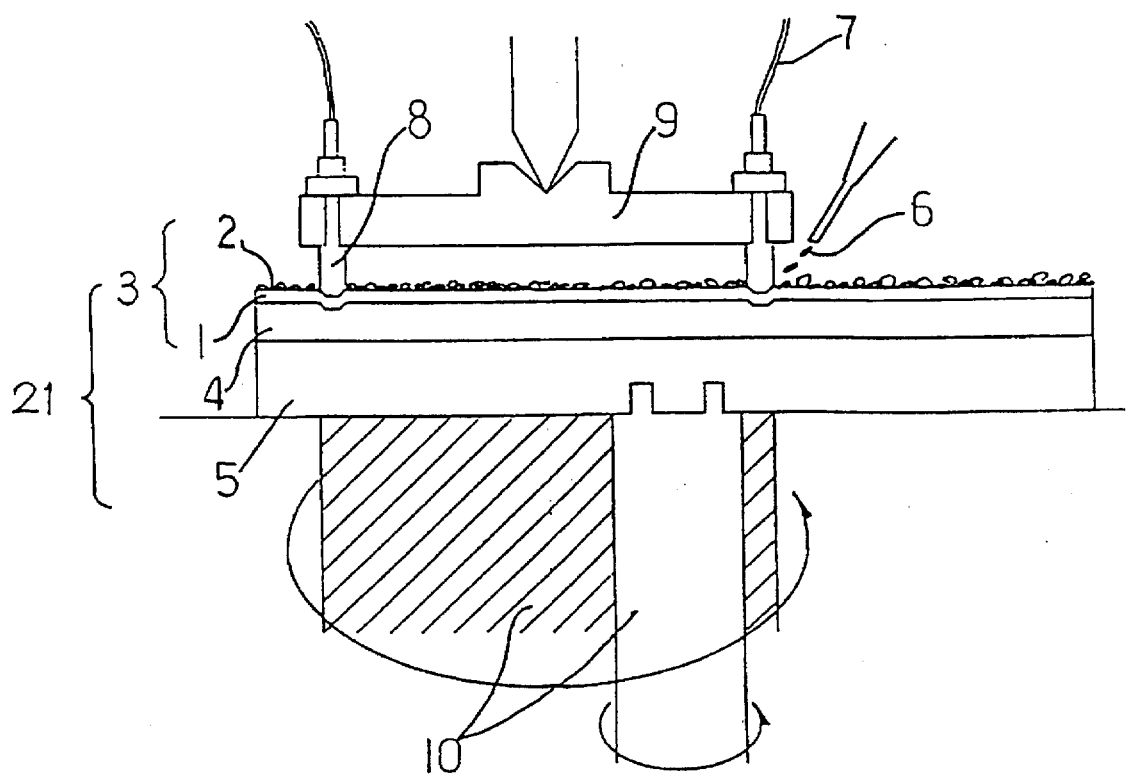
FIG. 2 illustrates a polishing method according to a first embodiment of the present invention.

FIG. 2 illustrates a polishing method according to an embodiment of the present invention which is implemented in a configuration comprising an abrasive film 3 obtained by applying and fixing alumina type particles 2 on a resin film 1, an abrasive disc 21 provided by applying said abrasive film 3 onto an elastic sheet 4 on a base 5, an abrasive 6 mainly composed of colloidal particles of $SiO_2$, a ferrule 8 to be polished having an optical fiber 7 securely bonded therein, a jig 9 for holding and fixing said ferrule, and a driving device 10 for rotating said abrasive disc 21. The end face of said optical connector ferrule including the optical fiber is polished by pressing the ferrule 8 against the upper surface of the alumina abrasive film 3 on said abrasive disc 21 and by sliding the end of said optical connector ferrule relative to the surface of said abrasive film with the abrasive 6 supplied to the surface of the abrasive film.

Figure 3:
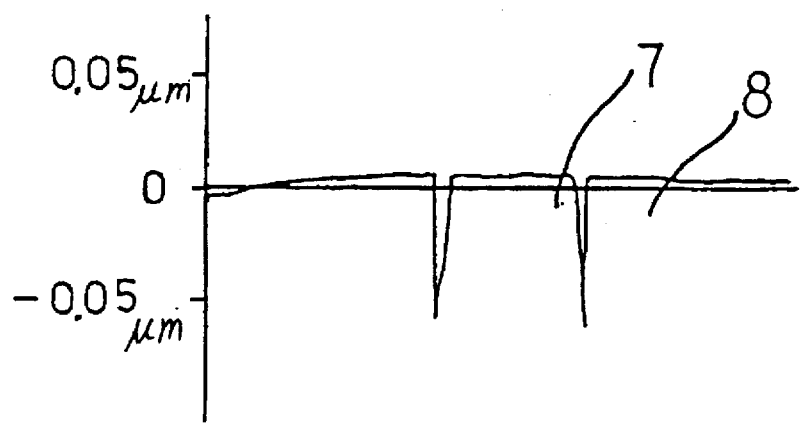
FIG. 3 shows the shape of the end face of a ferrule obtained using the polishing method.

Using such a polishing method in the final polishing process for about one minute, the end of the optical connector ferrule can be polished in the form of a convex spherical surface having a radius of curvature of about 5–100 mm and with the optical fiber 7 positioned at the vertex thereof. FIG. 3 shows the measurement of the shape of the end of the resultant connector ferrule obtained using a surface roughness meter. The measurement shows that the step formed between the ferrule 8 and the optical fiber 7 is 0.05 μm or less and that the surface roughness of the optical fiber is 0.001 μm or less. Further, the return loss of the optical connector ferrule is 40 dB or more.

A detailed description will now be made on the abrasive film 3 having alumina type particles 2 applied and fixed thereon and the abrasive 6 mainly composed of colloidal particles of $SiO_2$.

Figure 4:
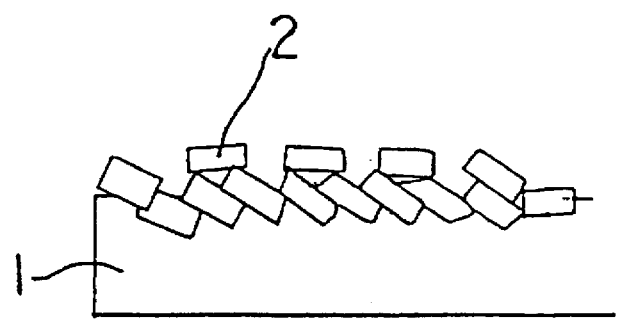
FIG. 4 shows a laminated structure of alumina particles on an abrasive film used in the polishing method according to the present invention.

First, as shown in FIG. 4, alumina type particles 2 having a grain size of about 0.5 μm are laminated on the resin film 1 in the form of staggered blocks using a method such as spraying to provide a structure called plate-like alumina. When compared to a normal case wherein alumina of a constant grain size is uniformly laminated, this arrangement makes it easier to retain $SiO_2$ having a grain size of 0.03 μm which is a particulate abrasive between the alumina particles, allowing the effect of the colloidal $SiO_2$ to be exhibited permanently. In other words, the processing of the ceramic portion of the end face of the ferrule proceeds with the colloidal $SiO_2$ exhibiting a higher effect than the alumina particles applied and fixed on the film. At the same time, around the center of the ferrule end face where the colloidal silica is not press-retained, the quartz fiber can be polished by the alumina particles. As a result, the recess at the fiber portion is as small as 0–0.05 μm and the surface can be smoothly finished.

Although alumina having a grain size larger than 0.5 μm has high processing capability, it is less effective in processing the ceramic ferrule. As a result, the processing proceeds only in the fiber portion, resulting in a large recess at the fiber portion. Conversely if the grain size is reduced, it becomes difficult to retain $SiO_2$ particles. In this case, the alumina particles will have a higher polishing capability, and a recess will be produced by polishing which will proceed only in the fiber portion as described above.

On the other hand, colloidal $SiO_2$ is an abrasive which uses one kind of colloidal particles having an average grain size of 0.03 μm and which is obtained by a mixing $SiO_2$ as a main component and a very small amount of cellulose in water. Therefore, it is characterized in that it can be easily mixed and retained in the above-described plate-like alumina film and it can easily provide stable polishing performance in combination with the above-described abrasive film without a need for special care for the agitation and control of the abrasive.

In addition, the particles used for this sheet can be obtained at a low cost compared to abrasive films having diamond abrasive particles applied and fixed thereon and cellulose type resin films. Further, since ceramic is used, this sheet is characterized in that it is chemically and mechanically stable.

Figure 1:
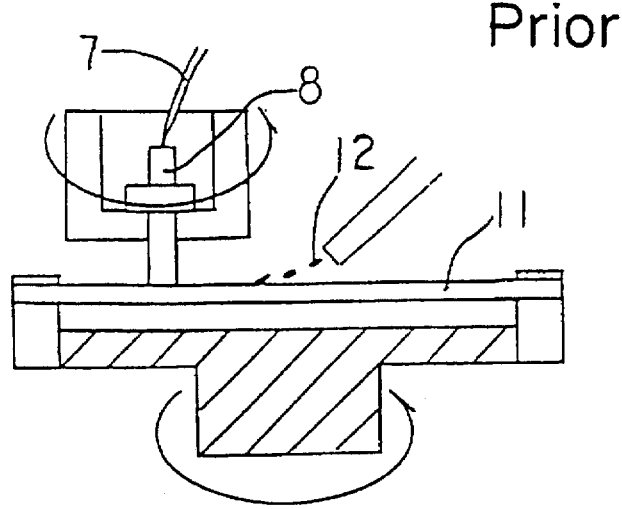
FIG. 1 shows a conventional polishing method.

Although the polishing method according to the present invention has been described with reference to a configuration wherein an abrasive film is applied to the elastic sheet as shown in FIG. 2, it is understood that the same effect can be obtained in a configuration where the abrasive film shown in FIG. 1 is used alone with a tensile force applied thereto.

As described above, according to the present invention, an abrasive film obtained by applying an fixing alumina type particles on a resin film in the form of blocks is used in combination with an abrasive constituted by colloidal particles of $SiO_2$, and this abrasive is supplied to the abrasive film. As a result, the colloidal $SiO_2$ particles on the abrasive film having plate-like alumina laminated thereon effectively improve the polishing efficiency of a ceramic ferrule, alumina particles smoothly polish the surface of an optical fiber, and the ferrule and the fiber which are different in workability can be uniformly processed. In the colloidal silica type abrasive including cellulose, the cellulose has a function of retaining $SiO_2$ when compared to conventional colloidal silica, and the above-described effect can be obtained by selecting the shape of the particles on the alumina sheet appropriately. This makes it possible to reduce abrasion-affected layers formed during the processing of an optical fiber, thereby suppressing reflected return beams to a very small amount. It is also possible to stably obtain a high performance optical connector ferrule having smaller retraction of the optical fiber from the surface of the ferrule at a low cost.

What is claimed is:

1. A method of polishing the end face of a ferrule on an optical connector, comprising: polishing the end face of the ferrule including an optical fiber by sliding the end face of the ferrule on the surface of an abrasive sheet film comprised of a resin film having a layer of alumina type particles disposed thereon while supplying an abrasive comprised of colloidal particles of $SiO_2$ onto the surface of the abrasive sheet film.

2. A method of polishing the end face of a ferrule on an optical connector according to claim 1; wherein the abrasive includes cellulose.

3. A method of polishing the end face of a ferrule on an optical connector according to claim 1; wherein the alumina type particles are laminated on the resin film so as to form steps.

4. A method of polishing the end face of a ferrule on an optical connector according to claim 1; wherein the alumina type particles have a plate-like shape and are laminated on the resin film.

5. A method of polishing the end face of a ferrule on an optical connector, comprising the steps of:

pressing the end face of a ferrule having an optical fiber fixed therein against the surface of an abrasive film of an abrasive disc comprised of an elastic sheet having the abrasive film disposed thereon, the abrasive film comprising a resin film having alumina type particles disposed thereon; and sliding the end face of the ferrule on the surface of the abrasive film while supplying an abrasive comprised of colloidal particles of $SiO_2$ on the surface of the abrasive film.

6. A method of polishing the end face of a ferrule on an optical connector according to claim 3; wherein the alumina type particles have an average grain size of 0.03 μm.

7. A method of polishing the end face of a ferrule on an optical connector according to claim 6; wherein the abrasive further comprises cellulose and water.

8. A method of polishing the end face of a ferrule on an optical connector according to claim 4; wherein the alumina type particles are laminated on the resin film in staggered relationship.

9. A method of polishing the end face of a ferrule on an optical connector according to claim 8; wherein the alumina type particles have an average grain size of 0.03 μm.

10. A method of polishing the end face of a ferrule on an optical connector according to claim 5; wherein the alumina type particles are laminated on the resin film in staggered relationship.

11. A method of polishing the end face of a ferrule on an optical connector according to claim 10; wherein the alumina type particles have an average grain size of 0.03 μm.

12. A method of polishing the end face of a ferrule on an optical connector according to claim 5; wherein the alumina type particles have an average grain size of 0.03 μm.

13. A method of polishing the end face of a ferrule on an optical connector according to claim 12; wherein the abrasive further comprises cellulose and water.

14. A method of polishing the end face of a ferrule on an optical connector, comprising the steps of:

providing an optical connector having a ferrule and an optical fiber fixed to the ferrule;

providing an abrasive sheet film comprised of a resin film having a layer of plate-like particles disposed on a surface thereof; and sliding an end face of the ferrule on the surface of the abrasive sheet film while supplying an abrasive comprised of colloidal particles of $SiO_2$ on the surface of the abrasive sheet film.

15. A method of polishing the end face of a ferrule on an optical connector according to claim 14; wherein the abrasive further comprises water and cellulose.

16. A method of polishing the end face of a ferrule on an optical connector according to claim 14; wherein the plate-like particles comprise alumina type colloidal particles.

17. A method of polishing the end face of a ferrule on an optical connector according to claim 16; wherein the alumina type colloidal particles have an average grain size of 0.03 μm.

18. A method of polishing the end face of a ferrule on an optical connector according to claim 16; wherein the alumina type colloidal particles are laminated on the surface of the resin film in staggered relationship.

19. A method of polishing the end face of a ferrule on an optical connector according to claim 14; wherein the plate-like particles are laminated on the surface of the resin film in staggered relationship.

* * * * *